(12) United States Patent
Goyal (10) Patent No.: US 7,437,730 B2
(45) Date of Patent: Oct. 14, 2008

(54) SYSTEM AND METHOD FOR PROVIDING A SCALABLE ON DEMAND HOSTING SYSTEM

(75) Inventor: Pawan Goyal, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 908 days.

(21) Appl. No.: 10/714,331

(22) Filed: Nov. 14, 2003

(65) Prior Publication Data

US 2005/0108712 A1     May 19, 2005

(51) Int. Cl.
G06F 9/46 (2006.01)
G06F 15/16 (2006.01)
G06F 15/173 (2006.01)

(52) U.S. Cl. .................. 718/105; 718/1; 718/104; 709/201; 709/202; 709/223; 709/226

(58) Field of Classification Search .............. 718/1, 718/100–108; 709/201–203, 223–226
See application file for complete search history.

(56) References Cited

U.S. PATENT DOCUMENTS

| | | | |
|---|---|---|---|
| 6,101,616 A | | 8/2000 | Joubert et al. |
| 6,324,177 B1 | | 11/2001 | Howes et al. |
| 6,332,180 B1 | * | 12/2001 | Kauffman et al. ......... 711/153 |
| 6,393,455 B1 | * | 5/2002 | Eilert et al. .................. 718/105 |
| 6,732,139 B1 | * | 5/2004 | Dillenberger et al. ....... 718/102 |
| 6,854,114 B1 | * | 2/2005 | Sexton et al. ................. 718/1 |
| 7,080,378 B1 | * | 7/2006 | Noland et al. ............... 718/104 |
| 7,117,499 B2 | * | 10/2006 | Kawamoto et al. .......... 718/105 |
| 7,171,668 B2 | * | 1/2007 | Molloy et al. ................ 718/105 |
| 2001/0049741 A1 | | 12/2001 | Skene et al. |
| 2002/0032850 A1 | | 3/2002 | Kauffman |
| 2002/0099759 A1 | * | 7/2002 | Gootherts .................... 709/105 |
| 2005/0160423 A1 | * | 7/2005 | Bantz et al. .................... 718/1 |

OTHER PUBLICATIONS

Andrzejak, Artur et al. "Bounding the Resource Savings of Utility Computing Models." Hewlet Packard Laboratories. Dec. 6, 2002.*

(Continued)

Primary Examiner—Lewis A. Bullock, Jr.
Assistant Examiner—Jennifer N To
(74) Attorney, Agent, or Firm—GSS Law Group (57) ABSTRACT

A VM based hosting architecture system in which finer grain control in optimizing multiple workloads across multiple servers is provided. The system includes a plurality of servers to be utilized by multiple workloads. In addition, the system includes a plurality of virtual machines (VMs) at each of the plurality of servers, wherein the plurality of VMs at each of the plurality of servers each serve a different one of the multiple workloads. Moreover, the system includes resource management logic to distribute server resources to each of the plurality of VMs according to predicted resource needs of each of the multiple workloads. Each of the multiple workloads are distributed across the plurality of servers, wherein fractions of each of the multiple workloads are handled by the plurality of VMs. The distribution of multiple workloads over multiple servers has the effect of achieving a finer grain control in optimizing workloads across the plurality of servers.

16 Claims, 4 Drawing Sheets

OTHER PUBLICATIONS

Keller, Axel et al. "Anatomy of a Resource Management System for HPC Clusters." Nov. 2000.*

Kotov, Vadim. "On Virtual Data Centers and Their Operating Environments." Hewlett Packard Laboratories. Mar. 8, 2001.*

Abdelzaher, Tarek et al. "Performance Guarantees for Web Server End-Systems: A Control-Theoretical Approach." IEEE. Jan. 2002.*

Graupner, Sven et al. "Resource-Sharing and Service Deployment in Virtual Data Centers." IEEE. 2002.*

Rolia et al., "Adaptive Internet Data Centers", HP Labs, CA, pp. 1-8.*

Lassettre et al., "Dynamic Surge Protection: An Approach to Handling Unexpected Workload Surges With Resource Actions That Have Dead Times," published on the web at www.research.ibm.com/autonomic/research/projects.html .6 pages.

Chandra et al., "Impact of Space-Time Multiplexing Granularity on Provisioning in On-Demand Data Centers: Opportunities and Challenges," published on the web at http://lass.cs.umass.edu/~lass/papers/ps/TR03-03.ps., 5 pages.

Chandra et al., "Quantifying the Benefits of Resource Multiplexing in On-Demand Data Centers," Proceedings of the First ACM Workshop on Alg. and Arch. for Self-Managing Syst. (Self-Manage 2003), San Diego, CA, Jun. 2003.

* cited by examiner

SYSTEM AND METHOD FOR PROVIDING A SCALABLE ON DEMAND HOSTING SYSTEM

FIELD OF THE INVENTION

The present invention relates to the field of virtual machine (VM) based hosting architectures and, more specifically, to a method of providing improved server utilization in a VM based hosting architecture.

BACKGROUND

Intranet and Internet data centers employ a form of hosting known as dedicated hosting. In dedicated hosting, servers are statically assigned to customers/applications (henceforth referred to as customers only). The number of servers assigned to each customers is determined based on the peak load that each customer may receive. Since the peak load is significantly higher than the average load, this results in lower than average utilization of the servers. It is desirable to design a hosting method that can improve the server utilization levels.

To improve server utilization levels, dedicated hosting solutions have been modified to dynamically assign servers to each customer. In such solutions, a traffic measuring entity determines the offered load for each customer. Based on the offered load, it determines the number of servers needed for each customer. Then the number of servers assigned to each customer is either increased or decreased. Though this solution improves upon the efficiency achieved by static assignment, it still is not as efficient as an ideal scheme. In fact, due to the time it takes to reassign servers, such a scheme may use more resources than an idealized scheme.

SUMMARY OF THE INVENTION

According to the present invention, there is provided a system to provide finer grain control in optimizing multiple workloads across multiple servers. The system includes a plurality of servers to be utilized by multiple workloads. In addition, the system includes a plurality of virtual machines (VMs) at each of the plurality of servers, wherein the plurality of VMs at each of the plurality of servers each serve a different one of the multiple workloads. Moreover, the system includes resource management logic to distribute server resources to each of the plurality of VMs according to predicted resource needs of each of the multiple workloads. Each of the multiple workloads are distributed across the plurality of servers, wherein fractions of each of the multiple workloads are handled by the plurality of VMs. The fractions of each of the multiple workloads handled by each of the VMs can be dynamically adjusted to provide for optimization of the multiple workloads across the multiple servers.

The distribution of server resources to each of the plurality of VMs includes distributing server resources to the plurality of VMs according to the current and predicted resource needs of each of the multiple servers. The server resources include percentage of CPU, percentage of network bandwidth, disk resources and memory resources.

Finer grain control is achieved through recognizing when one of the plurality of servers is overloaded and shifting work to another of the plurality of servers which is not overloaded.

The fractions of the multiple workloads being handled by the plurality of VMs can be dynamically adjusted in response to workload changes at the plurality of servers, wherein the dynamic adjustment provides for maintaining an optimum utilization level across the plurality of servers. The optimum utilization level can be configured automatically via server management software or manually by a user with administrative privileges. The workloads are each distributed over a subset of the plurality of VMs. Each VM in the subset of the plurality of VMs exists at a separate one of the plurality of servers. The workload distribution comprises distributing the work according to resources available to each of the VMs within the subset.

The system can also include at least one global resource allocator to monitor resource distribution between the plurality of VMs. The system can also include at least one load balancer to measure the current offered load. The global resource allocator determines how to distribute the resources between the plurality of VMs, according to the measurements received from the at least one load balancer. Each of the plurality of servers includes a local resource control agent to receive and implement instructions from the global resource allocator describing how the resources are to be distributed between the VMs located at each of the plurality of servers.

According to the present invention, there is provided a server optimization device, for providing finer grain control in a virtual machine (VM) based hosting architecture. The server optimization device includes at least one load balancer component to identify resource requirements for multiple different workloads in the VM based hosting architecture. In addition, the server optimization device includes a global resource allocator partitioning component to assign VMs from multiple server machines to a workload according to the identified resource requirements. The global resource allocator partitioning component further to assign resources at each of the multiple server machines to the assigned VMs according to the identified resource requirements.

The global resource allocator partitioning component can reassign the VMs according changes in the identified resource requirements.

The server optimization device further includes a plurality of resource allocator components at each of the multiple server machines, wherein the plurality of resource allocators are responsible for creating VMs and assigning VMs to workloads in response to instructions received from the global resource allocator partitioning component.

The server optimization device's at least one load balancer continuously monitors the resource requirements for the multiple different workloads and provides changes to the resource requirements of each of the multiple different workloads to the global resource allocator partitioning component. The global resource allocator partitioning component issuing instructions to the plurality of resource allocator components at each of the multiple server machines, wherein the issued instructions provide for redistributing server resources to each of the VMs within each of the multiple server machines. The redistribution of the server resources provides for optimizing workload across the multiple server to prevent the over-utilization or under-utilization of the multiple server machines. The instructions are issued automatically via server management software in order to maintain a pre-defined level of optimization within the system.

The VMs at each of the multiple server machines serve a different one of the multiple different workloads.

The resources comprise percentage of CPU, percentage of network bandwidth, disk resources and memory resources.

The multiple different workloads are distributed over a subset of the assigned VMs.

The multiple different workloads are each assigned to a customer application utilizing the VM based hosting architecture.

DETAILED DESCRIPTION

The invention will be described primarily as a system and method for allowing the distribution of a workload over multiple servers. Moreover, the invention will be described as a system and method to provide for the distribution of multiple workloads across multiple servers, where fractions of each workload are split across the multiple servers.

The distribution of multiple workloads over multiple servers can provide for the achieving of finer grain control in optimizing the workload across the multiple servers. The workload is balanced according to the resource utilization (e.g., memory, cpu, etc.) of each of those multiple servers. For example, where one server over which a workload is distributed becomes overloaded (e.g., excess resource utilization), another server over which the workload is distributed, which is under loaded (e.g., excess resources available), can take on a larger fractional portion of the overall workload in question.

In the following description, for purposes of explanation, numerous specific details are set forth in order to provide a thorough understanding of the present invention. It will be evident, however, to one skilled in the art that the present invention may be practiced without these specific details.

Those skilled in the art will recognize that an apparatus, such as a data processing system, including a CPU, memory, I/O, program storage, a connecting bus and other appropriate components could be programmed or otherwise designed to facilitate the practice of the invention. Such a system would include appropriate program means for executing the operations of the invention.

An article of manufacture, such as a pre-recorded disk or other similar computer program product for use with a data processing system, could include a storage medium and program means recorded thereon for directing the data processing system to facilitate the practice of the method of the invention. Such apparatus and articles of manufacture also fall within the spirit and scope of the invention.

The ability to allocate fractional server resources at fine time-scales of seconds can improve the multiplexing benefits that can be extracted when dynamically provisioning resources.

A virtual machine monitor (VMM) virtualizes a machine's hardware and enables the existence of multiple independent virtual machines (VM). By employing predictable and flexible resource management mechanisms, the virtual machine monitor can allocate different resource shares to different virtual machines. Although virtual machine monitors support multiple applications each requiring less than one server, in the exemplary embodiment, virtual machines are employed to support applications that span multiple servers.

In the exemplary embodiment, a set of virtual machines can serve a customer where multiple virtual machines, each belonging to a different customer are hosted on the same server. Hence, a single customer can be assigned multiple VMs, but according to the exemplary embodiment, the assigned multiple VMs each exist at separate servers. Resources allocated to the virtual machines are adjusted dynamically to handle the variations in each of the different customer workloads. Doing so ensures fine-grain space-time resource multiplexing: (i) fractional server allocation is possible by allocating non-zero shares to applications running on the same server, (ii) implicit fine-grain time multiplexing is enabled by employing proportional-share schedulers in the virtual machine monitor (which can reallocate unused machine resources at millisecond time-scales), and (iii) explicit fine-grain time multiplexing can be achieved by modifying scheduler parameters to specify an application's resource share. Further, virtual machines can provide isolation and security that are comparable to dedicated hosting architectures.

Although multiple virtual machines may be mapped onto a physical server, not all VMs need to be active at the same time. For instance, it is possible to emulate a dedicated hosting model by simply having one virtual machine active on each machine and keeping the other VMs in an idle state. This is achieved by allocating very small resource shares to the idle VMs and allocating most of the machine resources to the active VM. An active VM can be deallocated and an idle VM can be brought online by reducing the resource share of the former and increasing that of the latter. Thus, the server reallocation overhead can be reduced to hundreds of milliseconds. No additional application startup delay is incurred since the application is already idling in the VM. Furthermore, when necessary, the benefits of the shared hosting architectures can be accrued by having multiple active VMs on a machine, each using a certain fraction of the server resources (and keeping the remaining VMs in an idle state).

Although VMs traditionally have been designed to host workloads that require less than one server, the invention utilizes VMs to host workloads that require more than one server.

Several components are included within a hosting system which utilizes the invention. The hosting system within which the invention exists includes a set of servers each with a server partitioning technology such as virtual machine or LPAR. The servers may be either homogeneous or heterogeneous. Also, the hosting system includes a resource control agent at each of the servers, wherein the resource control agent can change the resource allocations for each of the server partitions dynamically. In addition, the hosting system includes a customer application(s) (customers) running on multiple VMs where each of the multiple VMs reside on a different server. In addition, the hosting system further includes a load balancer for each of the customers. Moreover, a global resource allocator for allocating resources among the multiple virtual machines hosted on each of the servers is also included. When a customer is added to the hosting system, the global resource allocator can allocate VMs to the customer and assign resources to the allocated VMs. The global resource allocator can also change resource allocations for each of the virtual machines within the hosting system in response to changes in workload for each of the customers.

Figure 1:
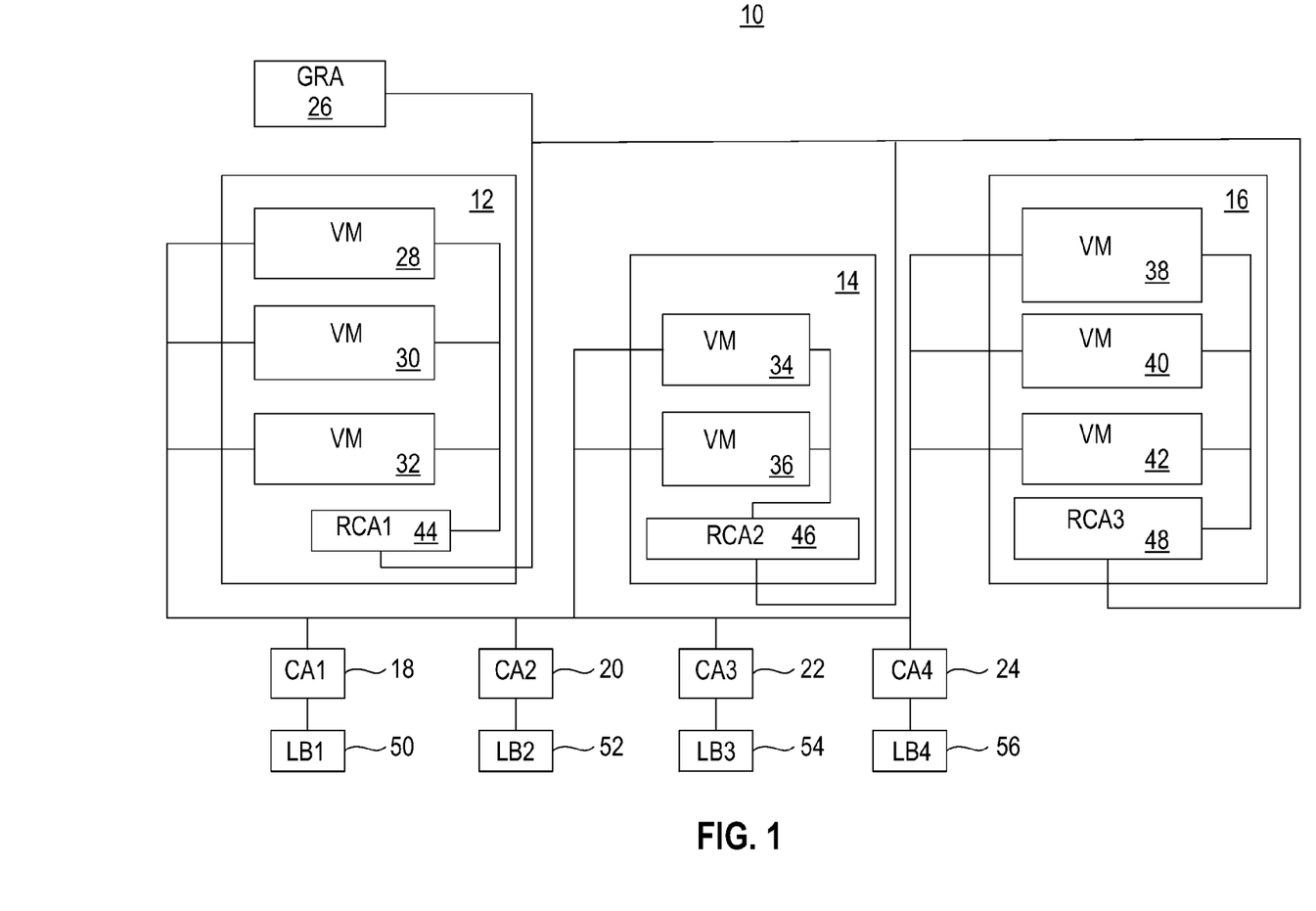
FIG. 1 illustrates an exemplary virtual machine (VM) based hosting architecture in which an exemplary embodiment of the invention is utilized.

FIG. 1 illustrates an example of a VM based hosting architecture 10 in which an exemplary embodiment of the invention is utilized. Hosting architecture 10 includes multiple servers (e.g., server one 12, server two 14 and server three 16). Hosting architecture 10 also includes multiple customers (e.g., customer one 18, customer two 20, customer three 22 and customer four 24). Hosting architecture 10 also includes global resource allocator 26.

Within each of server one 12, server two 14 and server three 16 there are multiple VMs. Server one 12 includes VM 28, VM 30 and VM 32; server two 14 includes VM 34 and VM 36; and server three 16 includes VM 38, VM 40 and VM 42. Also, server one 12 includes partitioning technology module 44; server two 14 includes partitioning technology module 46; and server three 16 includes partitioning technology module 48.

Attached to each of customer one 18, customer two 20, customer three 22 and customer four 24 is a load balancer. Customer one 18 includes attached load balancer 50; customer two 20 includes attached load balancer 52; customer three includes attached load balancer 54 and customer four includes attached load balancer 56.

While the invention will be explained within the context of hosting architecture 10, the invention is not limited to being practiced within such an architecture. For example, the invention may be utilized within an architecture including numerous customers, servers and VMs where a configurable number of VMs are assigned to each server within hosting architecture 10. Moreover, the invention can include a single load balancer, where the single load balancer can support multiple customers.

In the exemplary embodiment, resource allocation for each of the VMs is 1/N of the server to begin with. Accordingly, the initial resource allocation for the VMs included within hosting architecture 10 is ⅓ of server one 12 available resources for each VM included within server one 12, ½ of server two 14 available resources for each VM included within server two 14 and ⅓ of server three 16 available resources for each VM included within server three 16.

The load balancers (e.g., load balancer 50, load balancer 52 and load balancer 54) for each of the customers will measure the current offered load and send the information to the global resource allocator 26. For example, in hosting architecture 10 load balancer 50 measures the current offered load for customer one 18 and sends that measurement to the global resource allocator.

Upon receiving information corresponding to the measurement of the current offered load for each of the customers in hosting architecture 10, the global resource allocator 26 analyzes the received information and generates a prediction as to what resources will be needed by each of the customers.

After generating a prediction of what resources will be needed by each of the customers, the global resource allocator 26 changes the resource allocations for each of the VMs on all servers (e.g., server one 12, server two 14 and server three 16) to conform with the prediction generated above. As an example of changing resource allocations in response to the generated prediction, let the resource requirement prediction for some customer be D servers and let there be a total of S servers. The resource allocation for the VMs of this customer on each of the servers would be D/S. However, if the total resources required by all customers, exceeds the number of servers available, then resources are allocated in proportion to demand.

Figure 2:
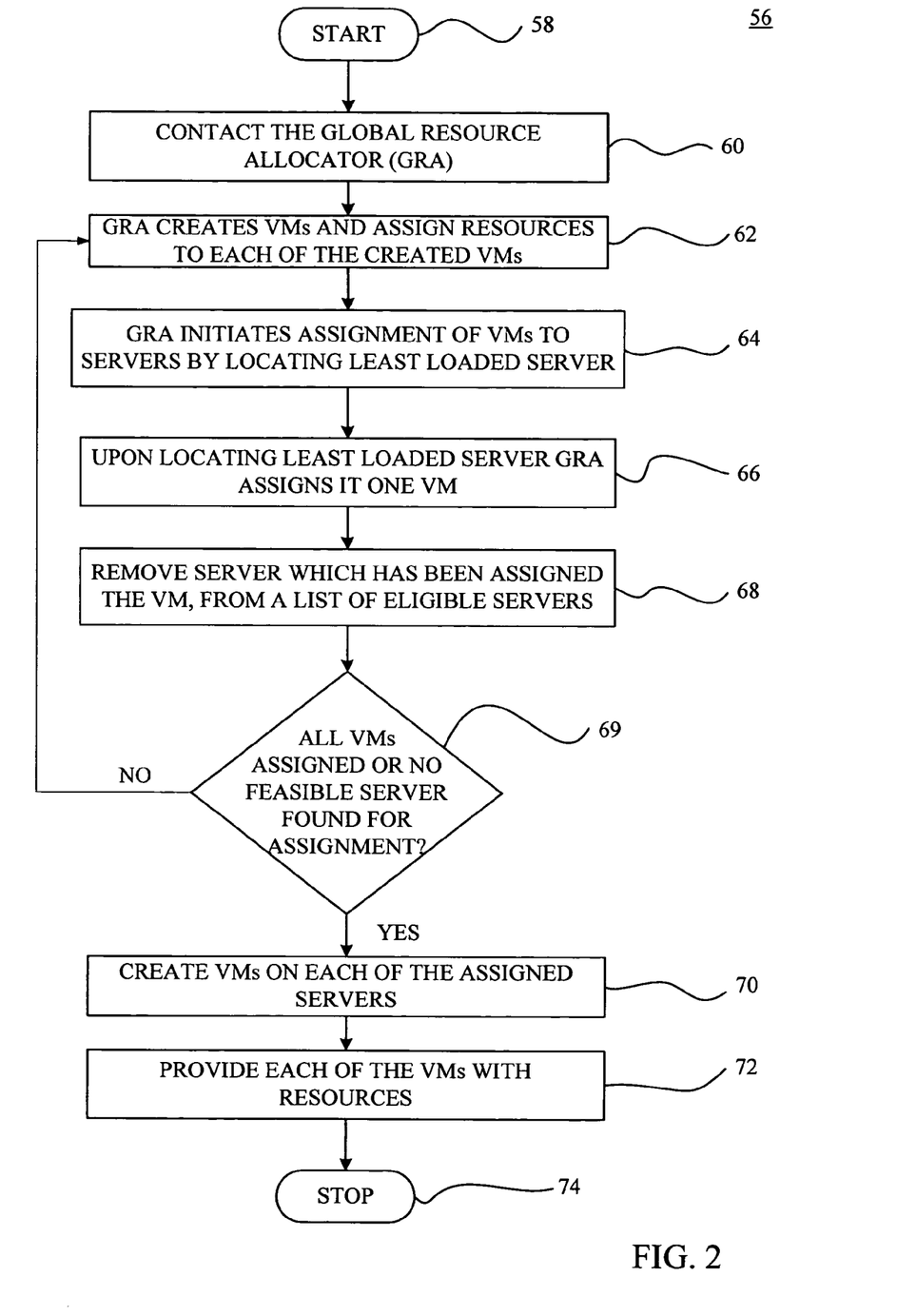
FIG. 2 is a method, according to an exemplary embodiment of the invention, for improving resource allocation and resource utilization when a new customer application is added to a hosting system.

FIG. 2 is a method 56, according to an exemplary embodiment of the invention, for improving resource allocation and resource utilization when a new customer application is added to a hosting system. Let the total number of servers in the system be S. The servers may be either homogeneous or heterogeneous. If the servers are heterogeneous, let each of their capacity be normalized with respect to the capacity of some server. For example, if the capacity of a server is 50% more than the capacity of the server chosen for normalization, then in normalized units the capacity is 1.5. Let $C_i$ be the capacity of server i. Let the initial estimated demand for customer i be $D_i$ servers. Also, let $M_i$ be the maximum number of servers on which customer i can be hosted. Initially, there are no virtual machines on any server and hence no load.

At block 58, method 56 begins.

At block 60, when a customer (e.g., customer one 18, customer two 20, customer three 22, customer four 24, etc.) is added, the global resource allocator 26 is contacted. The global resource allocator 26 is contacted by the customer so that an initial resource allocation can be made by global resource allocator 26 to the customer.

At block 62, global resource allocator 26 creates $M_i$ virtual machines and assigns each virtual machines $D_i/M_i$ resources. For example, when customer one 18 was added to hosting architecture 10, virtual machines 28, 36 and 42 were created and assigned to customer one 18. In one exemplary embodiment, the virtual machines (e.g., 28, 34, 38, etc.) are created when a customer (e.g., 18, 20, etc.) is added, or when each server (e.g., 12, 14, 16, etc.) is initialized to have an assigned number of virtual machines.

At block 64, the global resource allocator 26 initiates its effort to assign (also known as mapping) the created VMs to servers by locating the least loaded server which has at least $D_i/M_i$ remaining resources. At block 66, upon locating the least loaded server, the global resource allocator 26 assigns one of the customers virtual machines to the located least loaded server.

At block 68, after assigning one of the virtual machines to the least loaded server, this server is removed from the set of eligible servers. The method 56 loops back to block 62 and blocks 62 to 66 are repeated until all the virtual machines are assigned or no feasible server is found for assignment. In the exemplary embodiment, in the circumstance where no feasible server is found, the customer is not hosted on the hosting system (e.g., hosting architecture 10).

At block 70, after all of the virtual machines have been assigned to servers, the global resources allocator 26 creates the virtual machines on each of the assigned servers.

At block 72, each of the virtual machines are provided with resources (e.g., percentage of CPU, network, disk resources, memory resources, etc.). In the exemplary embodiment, on server j, the virtual machine is given $D_i/M_i/C_j$ fraction of CPU, network, disk and memory resources of the server. The VMs are provided with resources as a result of the global resource allocator 26 contacting each of the servers resource control agents and submitting a request for the resource control agents to make the resource assignments to the VMs.

For example, virtual machines 28, 36 and 42 were mapped to servers 12, 14 and 16 respectively after being assigned to customer one 18 when customer one 18 was added to hosting architecture 10. Next, virtual machines 28, 36 and 42 were created by the global resources allocator 26 at each of servers 12, 14 and 16 respectively. Next, global resource allocator contacted resource control agents 44, 46 and 48, and requested that each of them assign resources to virtual machines 28, 36 and 42 respectively.

At block 74, method 56 ends.

Figure 3A:
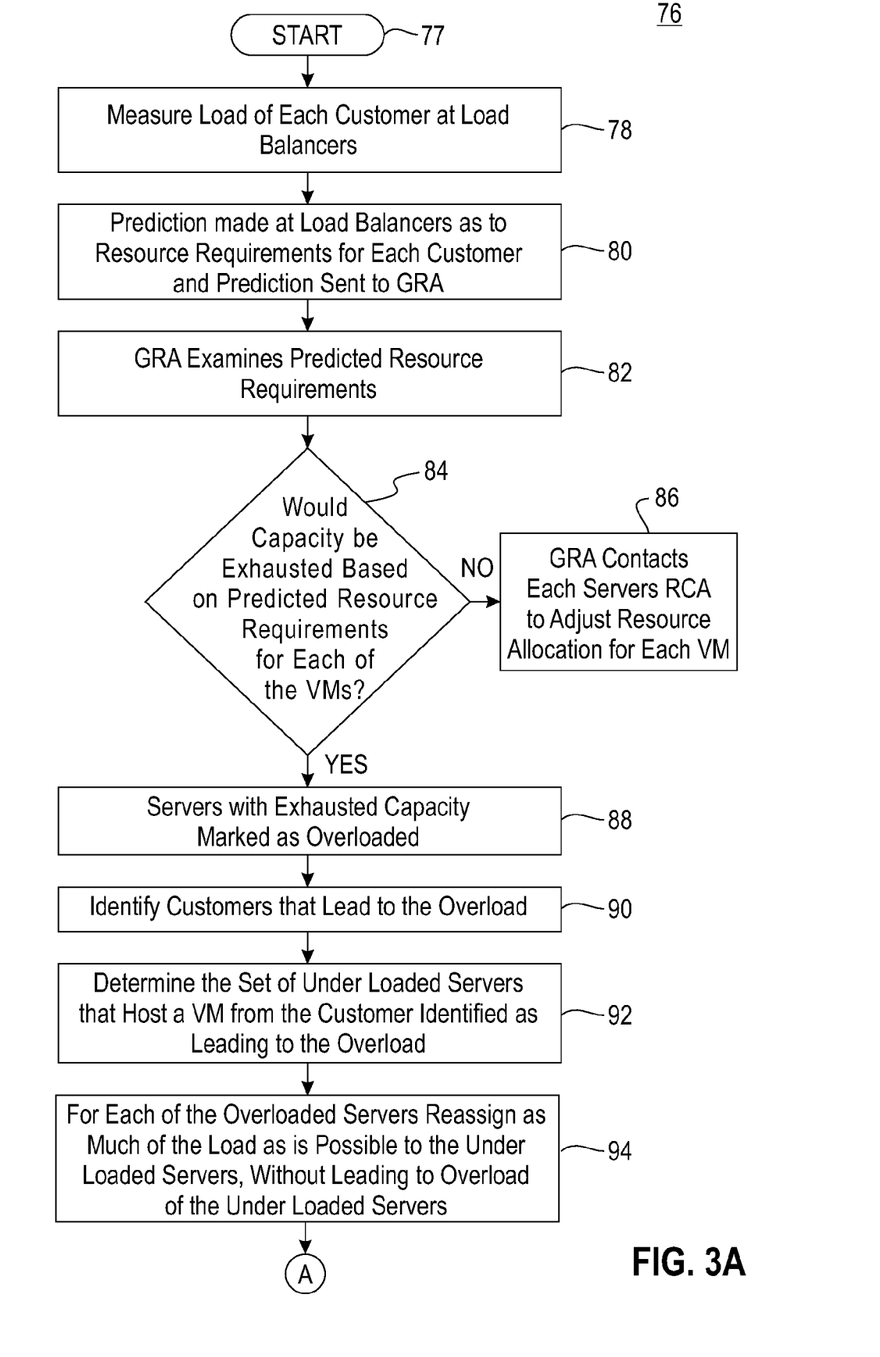
FIG. 3 is a method, according to an exemplary embodiment of the invention, for adjusting resource allocations in a hosting architecture in response to workload changes in the hosting architecture.
Figure 3B:
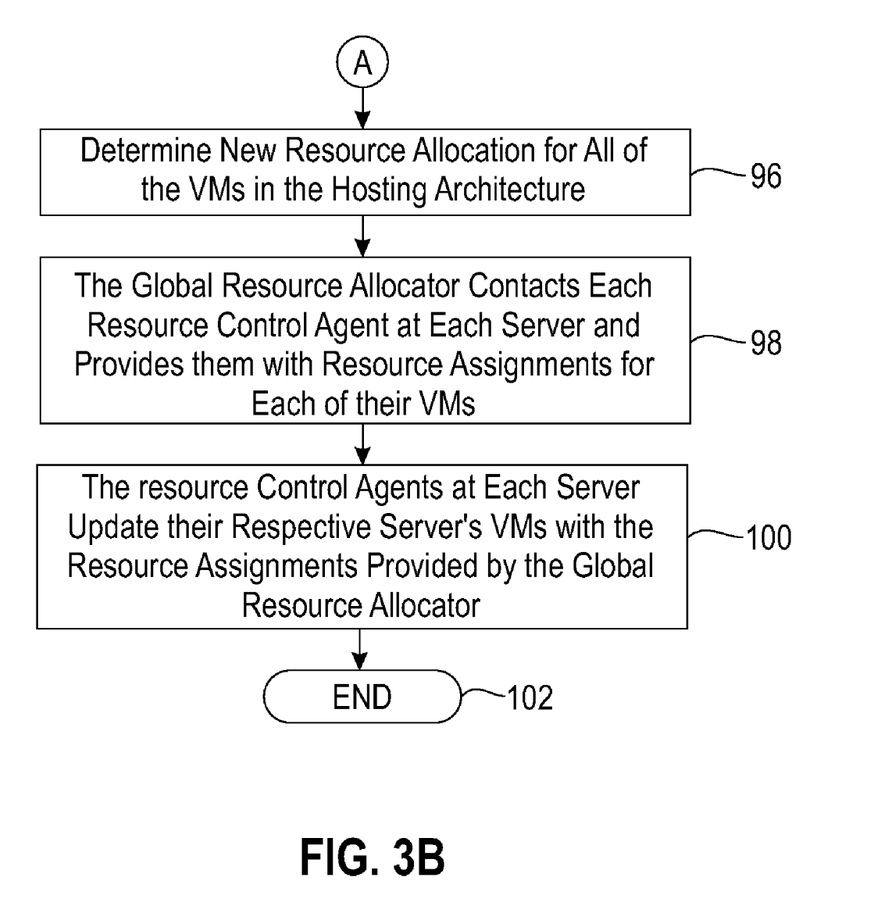

FIG. 3 is a method 76, according to an exemplary embodiment of the invention, for adjusting resource allocations in a hosting architecture 10 in response to customer workload changes in the hosting architecture 10.

At block 77, method 76 begins.

At block 78, each of the load balancers (e.g., load balancers 50, 52, 54 and 56) in the hosting system measure incoming load for each of their respective customers (e.g., customers 18, 20, 22 and 24) and saves the measured incoming loads in a local database. In an alternative embodiment, a single load balancer may serve multiple customers or all customers in the hosting system.

At block 80, the load balancers included within hosting architecture 10 predict the resource requirements for each of their respective customers every T seconds (based on customer workload data collected by the load balancers), and send the predicted resource requirements to global resource allocator 26. In the exemplary embodiment the resource requirement predictions can be utilizing one of many algorithms.

At block 82, the global resource allocator 26 examines the predicted resource requirements for each of the customers every T seconds.

At decision block 84, a determination is made by global resource allocator 26 to determine if any server capacity would be exhausted based on the predicted resource requirements for each of the virtual machines. If no, server capacity would not be exhausted, then at block 86, the global resource allocator 26, contacts the resource control agent (e.g., resource control agent 44, 46 and 48) on each of the servers (e.g., servers 12, 14 and 16) to adjust the resource allocation for each of the virtual machines as per the predictions made by the load-balancers at block 80.

If yes, server capacity would be exhausted (e.g., some servers will be overloaded), then at block 88, the server(s) with exhausted capacity will be marked as overloaded. The objective is to move load from the overloaded to the under loaded servers until they are no longer overloaded. In an exemplary embodiment of the invention, no new virtual machines are created in order to address the movement of load from the overloaded to the under loaded servers.

At block 90, for each of the servers marked as overloaded, the customers leading to the overload are identified.

At block 92, for each of the identified customers, determine the set of under loaded servers that host a virtual machine from the same customer.

At block 94, for each of the overloaded servers, reassign as much of the load as is possible to the under loaded servers, without leading to overload of the under loaded servers, and only as much as is necessary to bring the overloaded server back to normal load. In the exemplary embodiment, the reassigning of load from overloaded to under loaded servers includes reassigning load to those servers which include a virtual machine assigned to the customer within which the load needs to be transferred.

At block 96, an algorithm determines the new resource allocation for all of the virtual machines in hosting architecture 10.

At block 98, the global resource allocator 26 contacts each resource control agent (e.g., resource control agent 44, 46 and 48) at each server (e.g., servers 12, 14 and 16) within hosting architecture 10 and provides them with resource assignments for each of their virtual machine.

At block 100, the resource control agents at each server update their respective server's VMs with the resource assignments provided by the global resource allocator 26.

At block 102, method 76 ends.

Thus, a method and system to provide finer grain control in optimizing multiple workloads across multiple servers has been described. Although the present invention has been described with reference to specific exemplary embodiments, it will be evident that various modifications and changes may be made to these embodiments without departing from the border spirit and scope of the invention. Accordingly, the specification and drawings are to be regarded in an illustrative rather than a restrictive sense.

What is claimed is:

1. A system to provide finer grain control in optimizing multiple workloads across multiple servers, comprising:
   a plurality of servers to be utilized by multiple workloads;
   a plurality of virtual machines at each of the plurality of servers, wherein the plurality of virtual machines at each of the plurality of servers each serve a different one of the multiple workloads; and
   resource management logic to distribute server resources to each of the plurality of virtual machines according to current and predicted resource needs of each of the multiple workloads utilizing the server resources,
   whereby, each of the multiple workloads are distributed across the plurality of servers, wherein fractions of each of the multiple workloads are handled by the plurality of virtual machines,
   whereby, the fractions of each of the multiple workloads handled by each of the virtual machines can be dynamically adjusted to provide for optimization of the server resources utilized by the multiple workloads across the multiple servers.

2. The system of claim 1 wherein the server resources comprise percentage of CPU, percentage of network bandwidth, disk resources and memory resources.

3. The system of claim 1 wherein the finer grain control is achieved through recognizing when one of the plurality of servers is overloaded and shifting work to another of the plurality of servers which is not overloaded.

4. The system of claim 1 wherein the fractions of the multiple workloads being handled by the plurality of virtual machines can be dynamically adjusted in response to workload changes at the plurality of servers, wherein the dynamic adjustment provides for maintaining an optimum utilization level of the server resources utilized by the multiple workloads distributed across the plurality of servers.

5. The system of claim 4 wherein the optimum utilization level can be configured automatically via server management software or manually by a user with administrative privileges.

6. The system of claim 1 wherein the workloads are each distributed over a subset of the plurality of virtual machines.

7. The system of claim 6 wherein each VM in the subset of the plurality of virtual machines exists at a separate one of the plurality of servers.

8. The system of claim 7 wherein the workload distribution comprises distributing the work according to resources available to each of the virtual machines within the subset.

9. The system of claim 1 further comprises at least one global resource allocator to monitor resource distribution between the plurality of virtual machines.

10. The system of claim 9 further comprises at least one load balancer to measure the current offered load.

11. The system of claim 10 wherein the global resource allocator determines how to distribute the resources between the plurality of virtual machines, according to the measurements received from the at least one load balancer.

12. The system of claim 11 wherein each of the plurality of servers includes a local resource control agent to receive and implement instructions from the global resource allocator describing how the resources are to be distributed between the virtual machines located at each of the plurality of servers.

13. A server optimization device having a processor, the server optimization device comprising:
   a load balancer associated with a respective customer workload needing at least one workload server and for providing offered workload messages to a provider of workload servers;

a global resource allocator (GRA) for inclusion in said provider of workload servers, and for receiving said offered workload messages and assigning an optimum matching of combinations of whole integer numbers of workload servers and fractional virtual workload servers that the GRA controls to each of the respective customer workloads according to identified resource requirements.

14. The server optimization device of claim 13 wherein the fractional virtual workload servers are reassigned according to changes in the identified resource requirements of the workload assigned.

15. The server optimization device of claim 13 further comprises a resource control agent associated with each of the whole integer number of workload servers, for creating and assigning fractional virtual workload servers to workloads in response to instructions received from the global resource allocator.

16. The server optimization device of claim 13 wherein the identified resource requirements comprise the percentage of CPU, percentage of network bandwidth, disk resources and memory resources that are needed by a workload.

* * * * *